United States Patent
Miller

(10) Patent No.: US 7,127,820 B2
(45) Date of Patent: Oct. 31, 2006

(54) FLEXIBLE FLUSH CUT SAW

(75) Inventor: Michael Miller, Winnetka, IL (US)

(73) Assignee: Miller Dowel Company, Winnetka, IL (US)

( * ) Notice: Subject to any disclaimer, the term of this patent is extended or adjusted under 35 U.S.C. 154(b) by 0 days.

(21) Appl. No.: 10/993,670

(22) Filed: Nov. 19, 2004

(65) Prior Publication Data

US 2006/0107537 A1    May 25, 2006

(51) Int. Cl.
B27B 21/00    (2006.01)

(52) U.S. Cl. .......................... 30/502; 30/166.3; 30/278; 30/279.2; 30/280; 30/351; 30/353; 30/501

(58) Field of Classification Search .................. 30/1.5, 30/109–113, 166.3, 278, 279.2, 279.4, 279.6, 30/280, 351, 353, 355, 357, 501, 502; 7/150; 451/526, 527, 529; 125/18; 83/662, 835, 83/838; 407/29.1–29.15; D7/695
See application file for complete search history.

(56) References Cited

U.S. PATENT DOCUMENTS

| 991,249 | A |  | 5/1911 | Sizemore | 30/501 |
| 1,102,124 | A |  | 6/1914 | Baptiste | 30/1.5 |
| 1,335,659 | A |  | 3/1920 | Collins | 30/501 |
| 1,423,843 | A |  | 7/1922 | Eshelman et al. | 30/501 |
| 1,707,804 | A |  | 4/1929 | Haase | 81/3.4 |
| 2,031,420 | A |  | 2/1936 | Lebherz | 81/3.09 |
| 2,046,334 | A | * | 7/1936 | Loeber | 30/169 |
| 2,807,877 | A | * | 10/1957 | Fryer et al. | 30/280 |
| 2,836,209 | A | * | 5/1958 | Zern | 30/502 |
| 2,984,272 | A |  | 5/1961 | Ehrens | 30/503 |
| 3,303,562 | A |  | 2/1967 | Booth | 30/166.3 |
| 4,021,912 | A | * | 5/1977 | Stanfield | 30/280 |
| 4,603,477 | A |  | 8/1986 | Francis | 30/50 |
| 5,653,023 | A |  | 8/1997 | Andina | 30/1.5 |
| 5,875,515 | A | * | 3/1999 | Dallas | 15/236.05 |
| 6,745,476 | B1 |  | 6/2004 | Korba, Jr. | 30/292 |

OTHER PUBLICATIONS

Copy of Marples® packaging for Hand Saws.

* cited by examiner

*Primary Examiner*—Boyer D. Ashley
*Assistant Examiner*—Carolyn T Blake
(74) *Attorney, Agent, or Firm*—Welsh & Katz, Ltd.

(57) ABSTRACT

The invention described herein relates to a flush cut saw that is capable of safely making a flush cut. The saw has a handle with a thin, flexible blade extending therefrom. The blade has two elongated extensions running away from the handle. The extensions can each have external and internal edges, and are mounted in a spaced, opposed relation. The internal edges can be provided with teeth preferably oriented to allow for a pull cut. The external edges are dull, and may be curved to prevent injury.

8 Claims, 2 Drawing Sheets

US 7,127,820 B2

FLEXIBLE FLUSH CUT SAW

FIELD OF THE INVENTION

This invention relates to saws and more specifically to saws capable of safely flush cutting a relatively narrow protrusion to create a flat surface.

BACKGROUND ART

In woodworking, there are often times when protrusions interrupt a flat surface of wood. For example, people often times use nails, dowels or other similar devices to connect two different pieces of wood. When so doing, a portion of the dowel may undesirably extend beyond the surface of the article that it is connecting. In order to create a smooth surface, it is desirable to saw off the extending portion of the dowel.

Saws are well known in the art. Traditional saws, such as that shown in U.S. Pat. No. 1,423,843 make it difficult to make flush cuts. One reason this is difficult is that the handle is oriented such that an operator's knuckles would hit the surface of the article, preventing an accurate cut. Further, the blade of a traditional saw is not oriented such that a flat flush cut can be made with precision and accuracy.

Saws that have been designed to make flush cuts suffer other deficiencies. Typically, these saws have blades on their exterior. During any sawing operation, there is a tendency of an operator to angle the blade while cutting. When using a typical flush cut saw, a typical right-handed operator gripping the saw with his right hand may unintentionally allow his fingers to rotate upward (and vice versa for a left-handed operator). This rotation causes the exterior saw blade to be angled slightly downward toward the surface of the wood. This results in the operator unintentionally cutting into the flat surface. These unwanted scratches are a problem in the woodworking industry because they are very difficult to remove. In high quality goods, a scratch can wreck the value of the entire article being constructed. This problem is especially acute in commercial production where repeated, monotonous sawing can cause an operator to make many of these scratches throughout the day.

In addition, exterior blades can be quite dangerous. While sawing, the tendency is for a right-handed operator to place his left hand on the surface to stabilize it and achieve leverage, and then saw inwardly, toward the left hand with his right hand (and vice versa for a left-handed operator). With an exterior blade, this is dangerous because, on completing the cut through the dowel, the sharp blade of the saw is being pushed toward the exposed left hand. This is especially a problem in environments where there can be careless sawing due to repetitiveness (such as in factories) or where safety is imperative. For example, schools often times have wood shop classes that require flush cuts to be made. The prior art flush cut saws can be extremely dangerous for distracted or inexperienced sawers taking this class, and injuries caused by prior art saws can be a source of major liability for the school system.

It is therefore desirable to have a flexible saw capable of making a flush cut to consistently achieve a tight, flush cut without a significant possibility of scratching the wood. It is also desirable to have a flexible saw that is safe for use by inexperienced or careless sawers.

SUMMARY OF THE INVENTION

The invention described herein relates to a flexible flush cut saw that is capable of consistently and safely making a flush cut. The saw comprises a handle having a thin, flexible blade extending therefrom. The blade comprises two elongated extensions running away from the handle. The extensions each have external and internal edges, and are mounted in a spaced, opposed relation. The internal edges of the blade define an interior slot, which is preferably of a width of about 1–4 inches and a length of about 2–8 inches. The internal edges are preferably provided with teeth oriented to allow for a pull cut. The external edges are dull, and may be curved to prevent injury.

While the present invention is susceptible of embodiments in various forms, there will hereinafter be described some exemplary and non-limiting embodiments, with the understanding that the present disclosure is to be considered an exemplification of the invention and is not intended to limit the invention to the specific embodiments illustrated.

DETAILED DESCRIPTION OF THE DRAWINGS

Figure 1:
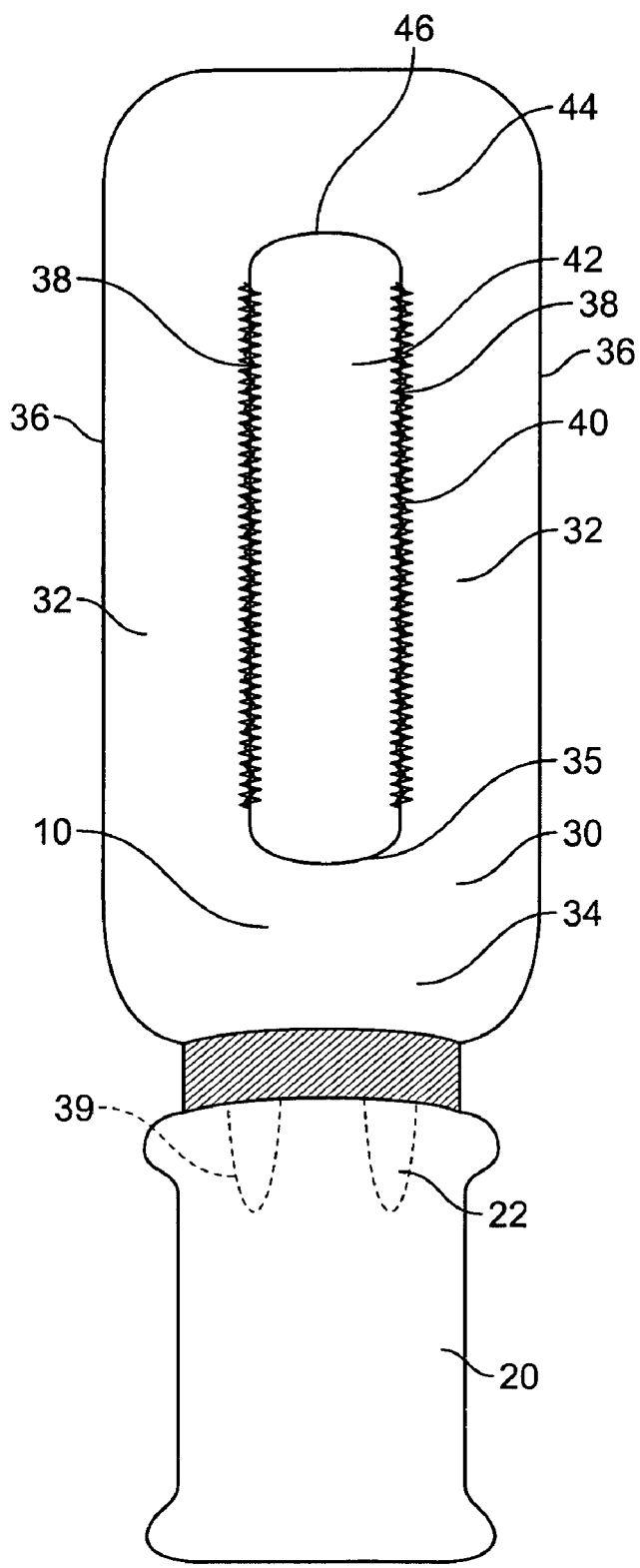
FIG. 1 shows a top view of a flexible saw.
Figure 2:
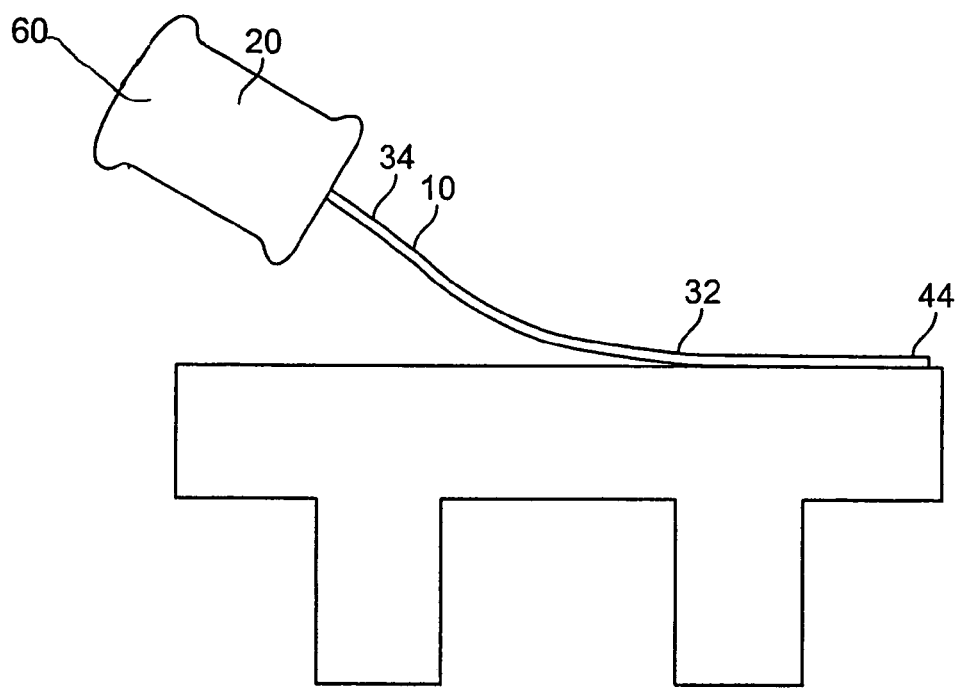
FIG. 2 shows a side view of a flexible saw while being flexed against a flat surface.

Referring now to FIGS. 1 and 2, a safe flush cutting saw according to one embodiment of the invention is shown. The saw 10 comprises a handle 20 and a blade 30 extending longitudinally therefrom. Preferably, the handle 20 is round and contoured such that an operator (not shown) can grab it. In one embodiment, the handle 20 is manufactured of plastic, although it can be manufactured of other suitable materials. The handle 20 can have grooves (not shown) contoured to the fingers of an operator. The handle 20 is preferably a rigid, durable, and capable of handling significant pressure.

Extending longitudinally away from the handle 20 is a blade 30. The blade 30 preferably comprises two elongated extensions 32 that run away from the handle 20. The extensions 32 can be mounted to the handle 20. In a preferred embodiment, the handle has recesses 22 in the surface of the handle proximate the blade 30. In another embodiment, the blade 30 is permanently affixed to the handle 20 through the use of glue, fasteners (not shown) or other methods known in the art. In another embodiment, the blade 30 can be temporarily mounted to the handle 20 through the use of a push-button mechanism (not shown) or other methods known in the art. This allows for interchangeable blades 30 to be mounted on the same handle 20, which is useful for attaching different blade 30 sizes or shapes. In another embodiment, the saw can be what is commonly referred to as a power tool. The handle 20 can comprise a motor 60 which derives power from batteries or an electrical outlet (not shown). The saw can also be powered by air power. In any such embodiment, the handle 20 can also comprise a movable element (not shown) that can move the blade 30 towards and away from the handle 20 in a repetitive, sawing motion.

As seen in FIGS. 1 and 2, the blade 30 can have a base 34. In a preferred embodiment, the base 34 has fingers 39 configured to engage the recesses 22 of the handle 20 to mount the blade 30 onto the handle 20. Extending longitudinally away from the base 34 are two extensions 32. The extensions 32 are configured in a spaced, opposed relation to each other. Preferably, the extensions 32 are parallel each other. In another embodiment, the extensions 32 may be angled away from each other to form a V shape, or only one extension 32 may be angled while the other is parallel the base 20. In another embodiment, the extensions 32 are adjustable such that a wide variety of angles between the two can be achieved. The extensions are preferably between about 1–24 inches long, more preferably about 3–15 inches long, and most preferably about 6–10 inches long. The extensions 32 each have external edges 36 and internal edges 38. The external edges 36 are dull, and may be curved or fitted with a safety material such as rubber (not shown). The external edges are exposed on the exterior of the blade. The internal edges 38 of the blade 30 along with a distal end 35 of the base define an interior slot 42. The interior slot 42 has a width determined by the distance between internal edges 38. The width is preferably about 1–6 inches, and more preferably about 1.5 to 3 inches. This width allows sawing of dowel sections (not shown) of between of ½ inch to at least 1½ inches. At least one of the internal edges 38 acts as a cutting edge. The internal edges 38 are unexposed. They can be serrated or provided with teeth 40. The cutting edge may be configured for a push cut, but is preferably configured for a pull cut. Preferably, the teeth 40 are hardened to allow for extended use and are configured to make a fine cut. Most preferably, the teeth 40 all are within the same plane such that a flush cut can be more accurately made. The blade 30 may have a top portion 44 that integrally bridges the extensions 32. When present, the top portion 44 provides structural integrity to the saw 10 and reduces unwanted vibrations while cutting. An interior edge 46 of the top portion 44 defines a forth side of the slit 42. With a top portion 44, the slit 42 preferably has a length of about 2–10 inches, more preferably has a length of about 4–8 inches, and most preferably has a length of about 6 inches.

FIG. 2 shows the saw 10 in a flexed position. To achieve this flexed position, the blade 30 must be flexible. Preferably, the blade 30 is composed of high-carbon spring steel. The blade is preferably thin, between $1/16^{th}$ and ¼ of an inch. In the flexed position, there must be a portion of the cutting edge of at least one of the internal edges 38 that lies flat against the surface 50 so that a flat cut can be achieved.

Figure 3:
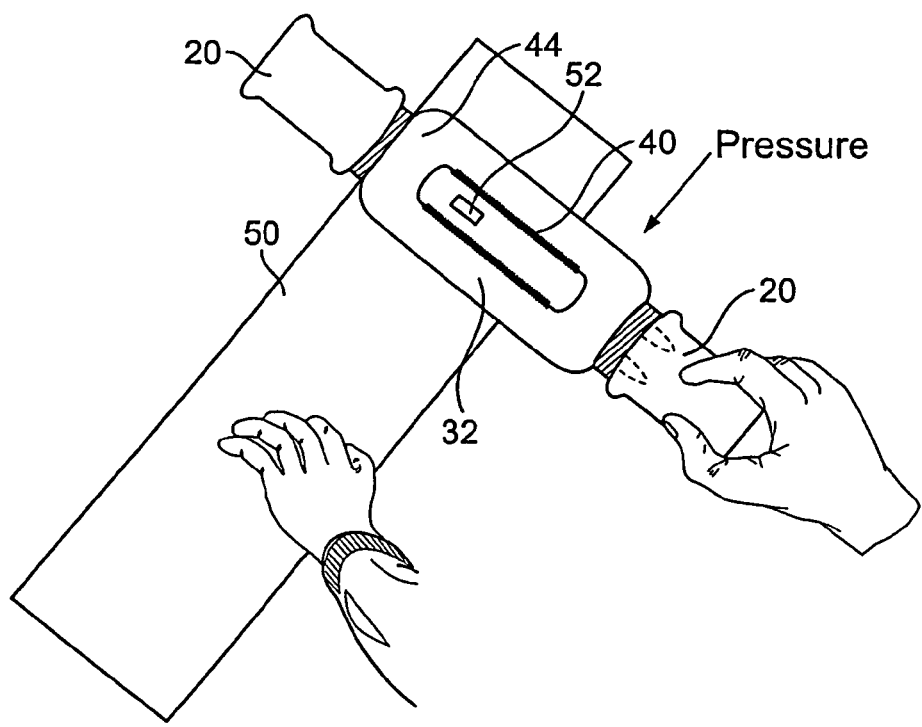
FIG. 3 shows an operator holding a flexible saw to safely saw off a protrusion on an otherwise flat surface.

FIG. 3 shows a projected use of the invented saw 10. As can be seen, the surface 50 that is desired to be flat has a protrusion 52 (in this case a wooden dowel) extending therefrom. It is also contemplated that the flexible flush cut saw can be capable of sawing other suitable materials such as metal, plastics, or other any material for which the saw is suited. The blade 30 is placed with a portion of the teethed internal edges 38 lying flat against the surface. The operator (hand shown) can grab the handle 20, and exert a downward force against the blade 30 causing it to flex into the position shown. The blade 30 is oriented such that the protrusion 52 is located inside of the interior slot 42.

The operator's opposite hand is placed on the surface 50 for balance and power. Because the blade 30 has internal edges 38 with teeth 40 that face each other, both left handed and right handed operators can easily utilize the invented saw 10. The operator makes a sawing motion while maintaining the blade 30 flexed flat against the surface, and applies a leftward force. As the blade 30 finishes cutting the protrusion 52 thereby creating a consistently flat surface 50, the leftward force pushes the saw toward the operator's left hand. However, the operator is not in danger of cutting himself because the saw teeth 40 are internal, and the external edge 36 is dull. Whereas a normal operator must be careful with the amount of leftward pressure he uses at the end of the cut, an operator using the invented saw 10 is able to exert an adequate amount of leftward pressure, increasing efficiency. The invented saw 10 therefore increases cutting speed and safety at the same time.

Further, the unique design having the cutting edge 38 on the interior slot 42 of the blade 30 prevents an operator from scratching the surface 50. Sometimes during flush cut sawing, due to operator error, there may be time when the blade is not flush with the surface 50. In ordinary blades, when an operator saws while the blade is not completely flush with the surface 50, i.e. the saw is angled relative to the surface, the exterior cutting edge of the prior art saw will still be in contact with the surface. The prior art saw will thus scratch the surface 50 when angled. This is a significant detriment to prior art blade designs. However, with the saw described herein, when the blade 30 is accidentally angled, the interior cutting edge 38 does not contact the surface; only the dull exterior edge 36 of the blade contacts it. This prevents an operator using the blade 30 as described herein from scratching the surface 50, allowing for consistent tight, flush cuts.

In some case, it may be advantageous to have an uninterrupted curved surface such as a table edge or the like. However, there may be a dowel or other protrusion 52 that extends and creates a non-smooth surface. It is therefore contemplated that the saw 10 have two handles 20. In such a case, the base portion 34 of the blade 30 is mounted on a first handle 20 while the top portion 44 of the blade 30 is mounted on a second handle 20. During operation, by applying appropriate force, the blade 30 of the saw 10 can be flexed to follow the contours of a curved surface (not shown). When pulled, the blade 30 will follow the curve of the surface to create a smooth curved cut.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A flexible flush cut saw comprising:
a handle; and
a thin, flexible blade extending therefrom, the blade comprising a base and elongated extensions, the base having a proximate end mounted to the handle and a distal end from which the elongated extensions extend from, the elongated extensions being spaced in substantially parallel, opposed relation to each other, with each extension having an internal edge and a dull external edge, at least one of the internal edges having a cutting portion extending substantially the entire length of the internal edge and the internal edges together defining an internal slot cutting area, wherein the blade is flexible for substantially the entire length of the blade such that an angled downward force applied to the handle is capable of flexing the blade and having the blade lie flat against a surface.

2. The flexible saw of claim 1 wherein the blade further comprises a top portion that bridges a distal end of the elongated extensions so that the internal slot cutting area is bounded on all sides.

3. The flexible saw of claim 1 wherein the blade is about 12 inches long.

4. The flexible saw of claim 2 wherein a second handle is mounted to the blade at the top portion.

5. The flexible saw of claim 1 wherein the cutting portion is serrated.

6. The flexible saw of claim 5 wherein the serrated portion comprises flat teeth.

7. The flexible saw of claim 1 wherein the handle comprises a motor effectively attached to the blade such that the motor is capable of moving the blade in a sawing motion.

8. The flexible saw of claim 1 wherein the blade is composed of high carbon spring steel.

* * * * *